US007818657B1

(12) United States Patent
Trimble et al.

(10) Patent No.: US 7,818,657 B1
(45) Date of Patent: *Oct. 19, 2010

(54) ELECTRONIC DOCUMENT FOR MORTGAGE TRANSACTIONS

(75) Inventors: J. Harvey Trimble, Great Falls, VA (US); Michael Daconta, Sierra Vista, AZ (US); Mark A Oliphant, Easton, MD (US); Jennifer Donaghy, Castine, ME (US)

(73) Assignee: Fannie Mae, Washington, DC (US)

( * ) Notice: Subject to any disclaimer, the term of this patent is extended or adjusted under 35 U.S.C. 154(b) by 950 days.

This patent is subject to a terminal disclaimer.

(21) Appl. No.: 10/321,823

(22) Filed: Dec. 17, 2002

Related U.S. Application Data

(60) Provisional application No. 60/369,030, filed on Apr. 1, 2002.

(51) Int. Cl.
*G06F 17/00* (2006.01)

(52) U.S. Cl. .................. 715/200; 715/234; 715/205; 715/255

(58) Field of Classification Search .............. 715/500, 715/513, 530, 501.1, 537, 234, 200, 205, 715/255; 713/176
See application file for complete search history.

(56) References Cited

U.S. PATENT DOCUMENTS

| 5,615,268 | A | 3/1997 | Bisbee et al. |
| 5,748,738 | A | 5/1998 | Bisbee et al. |
| 6,157,915 | A * | 12/2000 | Bhaskaran et al. ............. 705/7 |
| 6,189,009 | B1 | 2/2001 | Stratigos et al. |
| 6,209,095 | B1 * | 3/2001 | Anderson et al. ............ 713/176 |
| 6,237,096 | B1 | 5/2001 | Bisbee et al. |
| 6,249,795 | B1 * | 6/2001 | Douglis ....................... 715/511 |
| 6,289,460 | B1 | 9/2001 | Hajmiragha |
| 6,367,013 | B1 | 4/2002 | Bisbee et al. |
| 6,438,526 | B1 | 8/2002 | Dykes et al. |

(Continued)

FOREIGN PATENT DOCUMENTS

JP 2003256744 9/2003

(Continued)

OTHER PUBLICATIONS

"Smart Document Specification—RC6.6", Mortage Bankers Association of America, Inc., Sep. 19, 2002, pp. 1-87.

(Continued)

*Primary Examiner*—Thu Huynh
(74) *Attorney, Agent, or Firm*—Rader, Fishman & Grauer PLLC

(57) ABSTRACT

An electronic document includes header, view, data, and signature sections. The data section provides data typically processed in transactions involving the electronic document. The view section includes presentation formatting for displays corresponding to the data. Linking elements identify corresponding main data values and view data values respectively used to populate the data section and display presentation formatting, and are accessible for determining whether the data in the display and data section, providing assurances that processed data matches that found in documents used by parties to a transaction. A digital signature section allows a digital signature to be provided, and used to wrap that data and view sections, to ensure authenticity. The header section provides document type, state and other information that is readily accessed without otherwise scanning the electronic document.

34 Claims, 13 Drawing Sheets

U.S. PATENT DOCUMENTS

| | | |
|---|---|---|
| 6,452,614 B1 | 9/2002 | King et al. |
| 6,456,981 B1 | 9/2002 | Dejaeger et al. |
| 6,457,030 B1 * | 9/2002 | Adams et al. ............... 715/523 |
| 6,585,778 B1 * | 7/2003 | Hind et al. ................. 715/513 |
| 6,594,633 B1 | 7/2003 | Broerman |
| 6,609,200 B2 | 8/2003 | Anderson et al. |
| 6,635,089 B1 | 10/2003 | Burkett et al. |
| 6,704,906 B1 * | 3/2004 | Yankovich et al. ......... 715/505 |
| 6,751,632 B1 | 6/2004 | Petrogiannis |
| 6,848,048 B1 * | 1/2005 | Holmes ...................... 713/162 |
| 6,973,619 B1 * | 12/2005 | Hirose et al. ................ 715/530 |
| 2001/0005829 A1 | 6/2001 | Raveis |
| 2001/0018739 A1 | 8/2001 | Anderson et al. |
| 2001/0029482 A1 | 10/2001 | Tealdi et al. |
| 2001/0044764 A1 | 11/2001 | Arnold |
| 2002/0010679 A1 | 1/2002 | Felsher |
| 2002/0019838 A1 | 2/2002 | Petrogiannis |
| 2002/0029194 A1 | 3/2002 | Lewis et al. |
| 2002/0035578 A1 | 3/2002 | Stratigos et al. |
| 2002/0049624 A1 | 4/2002 | Raveis |
| 2002/0052814 A1 | 5/2002 | Ketterer |
| 2002/0059137 A1 | 5/2002 | Freeman et al. |
| 2002/0069179 A1 * | 6/2002 | Slater et al. ................... 705/67 |
| 2002/0069358 A1 | 6/2002 | Silvester |
| 2002/0073020 A1 | 6/2002 | McFarland et al. |
| 2002/0078159 A1 | 6/2002 | Petrogiannis et al. |
| 2002/0091651 A1 | 7/2002 | Petrogiannis et al. |
| 2002/0116321 A1 | 8/2002 | Areheart |
| 2002/0116331 A1 | 8/2002 | Cataline et al. |
| 2002/0116531 A1 | 8/2002 | Chu |
| 2002/0128969 A1 | 9/2002 | Parmelee et al. |
| 2002/0129256 A1 | 9/2002 | Parmelee et al. |
| 2002/0129257 A1 | 9/2002 | Parmelee et al. |
| 2002/0143711 A1 | 10/2002 | Nassiri |
| 2002/0169702 A1 | 11/2002 | Eaton, Jr. et al. |
| 2002/0178035 A1 | 11/2002 | Lajouanie |
| 2003/0009418 A1 | 1/2003 | Green et al. |
| 2003/0036994 A1 | 2/2003 | Witzig et al. |
| 2003/0055783 A1 | 3/2003 | Cataline et al. |
| 2003/0069975 A1 * | 4/2003 | Abjanic et al. .............. 709/227 |
| 2003/0074297 A1 | 4/2003 | Carragher |
| 2003/0110400 A1 | 6/2003 | Cartmell et al. |
| 2003/0120588 A1 | 6/2003 | Dodd et al. |
| 2003/0144948 A1 | 7/2003 | Cleary et al. |
| 2003/0145305 A1 * | 7/2003 | Ruggier ...................... 717/100 |
| 2003/0158811 A1 | 8/2003 | Sanders et al. |
| 2003/0172296 A1 | 9/2003 | Gunter |
| 2003/0172297 A1 | 9/2003 | Gunter |
| 2003/0172298 A1 | 9/2003 | Gunter et al. |
| 2003/0172299 A1 | 9/2003 | Gunter |
| 2003/0177071 A1 | 9/2003 | Treese et al. |
| 2003/0182151 A1 | 9/2003 | Taslitz |
| 2003/0208557 A1 | 11/2003 | Higbee |
| 2003/0225688 A1 | 12/2003 | Dobbins |
| 2003/0233418 A1 | 12/2003 | Goldman |
| 2004/0059683 A1 * | 3/2004 | Epstein et al. ................. 705/64 |
| 2004/0111619 A1 | 6/2004 | Laurie et al. |

FOREIGN PATENT DOCUMENTS

| | | |
|---|---|---|
| WO | WO0008541 | 2/2000 |
| WO | WO0019296 | 4/2000 |
| WO | WO0019315 | 4/2000 |
| WO | WO0049521 | 8/2000 |
| WO | WO0062140 | 10/2000 |
| WO | WO0127832 | 4/2001 |
| WO | WO0201479 | 1/2002 |
| WO | WO0203174 | 1/2002 |
| WO | WO0203774 | 1/2002 |
| WO | WO0221383 | 3/2002 |
| WO | WO0237367 | 5/2002 |
| WO | WO0237386 | 5/2002 |
| WO | WO02063431 | 8/2002 |
| WO | WO02075575 | 9/2002 |
| WO | WO02075615 | 9/2002 |
| WO | WO02075616 | 9/2002 |
| WO | WO02075617 | 9/2002 |
| WO | WO02075618 | 9/2002 |
| WO | WO03077130 | 9/2003 |

OTHER PUBLICATIONS

"Guidelines for Document Custodians", Fannie Mae, Sep. 9, 1999.

* cited by examiner

```xml
<?xml version="1.0" encoding="UTF-8"?>
<!DOCTYPE ELECTRONICDOC SYSTEM "electronicdoc_V1.dtd">
<ELECTRONICDOC DocId="MD01">
    <HEADER>
        <NAME Type="Note" State="Signable" Negotiable="True" MustBeRecorded="False"/>
        <AUDIT_TRAIL>
            <ENTRY Logger="Joe Smith" Action="Template" DateTime=
                "2000-12-08 14:54:00"/>
            <ENTRY Logger="Doc Prep" Action="Populated"
                DateTime="2001-05-09T09:30:01"/>
            <ENTRY Logger="Doc Prep" Action="Signable"
                DateTime="2001-05-09T09:31:23"/>
        </AUDIT_TRAIL>
        <SIG_MODEL>
            <SIGNER Areas="BorrowersAreas01" Role="Borrower" RoleOrder="1" Type="Text"
                Targets="Borrower01" Area="BorrowerArea01" Signature="Borrower01Sig"/>
            <SIGNER Role="TamperSeal" Type="Dsig" Targets="View01 Data01"
                Signature="TamperSeal01"/>
        </SIG_MODEL>
    </HEADER>
    <DATA Id="Data01">
        <MAIN>
            <LOAN><MORTGAGE_TERMS InterestRatePercent="6"/></LOAN>
            <BORROWER _FirstName="Rebecca" _MiddleName="Kate"
                _LastName="Thornton"/>
        </MAIN>
        <MAP Target="View01">
            <ARC DataEnd="//MORTGAGE_TERMS/@InterestRatePercent"
                ViewEnd="id(InterestRate)"/>
            <ARC DataEnd="//BORROWER/@_FirstName" ViewEnd="id(BorrowerNameFirst)"/>
            <ARC DataEnd="//BORROWER/@_MiddleName"
                ViewEnd="id(BorrowerNameMiddle)"/>
            <ARC DataEnd="//BORROWER/@_LastName" ViewEnd="id(BorrowerNameLast)"/>
        </MAP>
    </DATA>
    <VIEW Id="View01" MimeType="text/html" Tagged="True">
        <SIG_TARGET Id="Borrower01">
            <html>
                <head>
                    <title> NOTE </title>
                </head>
                <body>
                    I will pay interest at a yearly rate of
                    <span class="underlinedata" id="InterestRate">6</span>%. <br/>
                    <SIG_AREAS Id="BorrowersAreas01">
                        <SIG_AREA Id="BorrowerArea01">
                            <SIG_ABOVE> Borrower </SIG_ABOVE>
                            <br/>
                            <SIG_LINE Id="BorrowerSig01">
                                _____
                            </SIG_LINE> <br />
                            <SIG_BELOW>
                                <span id="BorrowerNameFirst">Rebecca</span>
                                <span id="BorrowerNameMiddle">Kate</span>
                                <span id="BorrowerNameLast">Thornton</span>
                            </SIG_BELOW>
                            <br/>
                        </SIG_AREA>
                    </SIG_AREAS>
                </body>
            </html>
        </SIG_TARGET>
    </VIEW>
</ELECTRONICDOC>
```

*FIG. 4*

```xml
<?xml version="1.0" encoding="UTF-8"?>
<!DOCTYPE ELECTRONICDOC SYSTEM "smartdoc_V1.dtd">
<ELECTRONICDOC DocId="MD01">
    <HEADER>
        <NAME Type="Note" State="Signed" Negotiable="True" MustBeRecorded="False"/>
        <AUDIT_TRAIL>
            <ENTRY Logger="Joe Smith" Action="Template" DateTime="2000-12-08 14:54:00"/>
            <ENTRY Logger="Doc Prep" Action="Populated" DateTime="2001-05-09T09:30:01"/>
            <ENTRY Logger="Doc Prep" Action="Signable" DateTime="2001-05-09T09:31:23"/>
        </AUDIT_TRAIL>
        <SIG_MODEL>
            <SIGNER Areas="BorrowersAreas01" Role="Borrower" RoleOrder="1" Type="Text"
                Targets="Borrower01" Area="BorrowerArea01" Signature="Borrower01Sig"/>
            <SIGNER Role="TamperSeal" Type="Dsig" Targets="View01 Data01"
                Signature="TamperSeal01"/>
        </SIG_MODEL>
    </HEADER>
    <DATA Id="Data01">
        <MAIN>
            <LOAN><MORTGAGE_TERMS InterestRatePercent="6"/></LOAN>
            <BORROWER _FirstName="Rebecca" _MiddleName="Kate" _LastName="Thornton"/>
        </MAIN>
        <MAP Target="View01">
            <ARC DataEnd="//MORTGAGE_TERMS/@InterestRatePercent" ViewEnd="id(InterestRate)"/>
            <ARC DataEnd="//BORROWER/@_FirstName" ViewEnd="id(BorrowerNameFirst)"/>
            <ARC DataEnd="//BORROWER/@_MiddleName" ViewEnd="id(BorrowerNameMiddle)"/>
            <ARC DataEnd="//BORROWER/@_LastName" ViewEnd="id(BorrowerNameLast)"/>
        </MAP>
    </DATA>
    <VIEW Id="View01" MimeType="text/html" Tagged="True">
        <SIG_TARGET Id="Borrower01">
            <html>
                <head>
                    <title> NOTE </title>
                </head>
                <body>
                    I will pay interest at a yearly rate of <span class="underlinedata"
                        id="InterestRate">6</span>%. <br/>
                    <SIG_AREAS Id="BorrowersAreas01">
                        <SIG_AREA Id="BorrowerArea01">
                            <SIG_ABOVE> Borrower </SIG_ABOVE>
                            <br/>
                            <SIG_TEXT Id="Borrower01Sig">
                                eSigned by Rebecca Thornton at 3:46 on 11/16/2001</SIG_TEXT>
                            <SIG_BELOW>
                                <span id="BorrowerNameFirst">Rebecca</span>
                                <span id="BorrowerNameMiddle">Kate</span>
                                <span id="BorrowerNameLast">Thornton</span>
                            </SIG_BELOW>
                            <br/>
                        </SIG_AREA>
                    </SIG_AREAS>
                </body>
            </html>
        </SIG_TARGET>
    </VIEW>
```

*FIG. 5A*

```xml
<?xml version="1.0" encoding="UTF-8"?>
<!--Title: electronic mortgage ELECTRONICDOC Document DTD
Description: This DTD contains the top level element ELECTRONICDOC as well as
definitions for the parts of the electronic document -->

<!-- include supporting DTDs -->
<!ENTITY % emrtgent-include SYSTEM "electronicdoc_V1.ent">
%emrtgent-include;
<!ENTITY % manifest "IGNORE">
<!ENTITY % electronicdoc "INCLUDE">
<!ENTITY % sdcore-include SYSTEM "electronicdoc _core_V1.dtd">
%sdcore-include;
<!ENTITY % dsig-include SYSTEM "xmldsig-core-schema-electronicdoc _V1.dtd">
%dsig-include;
<!-- include *modified* XHTML 1.0 Transitional DTD -->
<!ENTITY % html-include SYSTEM "xhtml1-transitional-electronicdoc_V1.dtd">
%html-include;
<!-- include Mortgage Data DTD -->
<!ENTITY % emrtg-include SYSTEM "mortgage_documents_V1.dtd">
%emrtg-include;
<!-- Entities specific to ELECTRONICDOC -->
<!ENTITY % html-block "html | span | div | table">

<!-- A SigContent can include an HTML block entity from the xhtml1-transitional-
        mortgage_V1.dtd. Note: block entity defined in xhtml1-transitional-
        mortgage_V1.dtd includes the sig model elements -->

<!ENTITY % sigContent "#PCDATA | html | %block; | form | %inline; | %misc; | td |
        th | ENDORSEMENT_AREA">
<!ENTITY % viewContent "#PCDATA | %html-block; | SIG_LINE | SIG_TARGET |
        SIG_AREA | Signature | SIG_IMAGE | SIG_TEXT | SIG_OBJECT">
<!ENTITY % SASblock "%block; | %inline; | SIG_AREA">
<!ENTITY % SAblock "%block; | %inline; | tr | td | SIG_LINE | ENDORSEMENT_AREA |
        Signature | SIG_IMAGE | SIG_TEXT | SIG_OBJECT | SIG_BELOW |
        SIG_ABOVE | SIG_DATA">

<!-- ELECTRONICDOC definition -->
<!ELEMENT ELECTRONICDOC (HEADER, ((DATA, VIEW*) | (DATA?, VIEW+)),
        SIGNATURES?)>
<!ATTLIST ELECTRONICDOC
        xmlns CDATA #FIXED "http://www.efanniemae.com/2001/emortgage"
        xmlns:xlink CDATA #FIXED "http://www.w3.org/1999/xlink"
        Version CDATA #FIXED "1.0"
        DocId CDATA #REQUIRED
        PackageId CDATA #IMPLIED>

<!ELEMENT DATA (MAIN, MAP?, CUSTOM?)>
<!ATTLIST DATA
        %iid;>
```

FIG. 6A

```
<!-- The Signature element is Included via
    dsig-include entity reference. -->
<!ELEMENT SIG_AREA (#PCDATA | %SAblock;)*>
<!ATTLIST SIG_AREA
        %rid;
>
<!ELEMENT SIG_IMAGE (#PCDATA | img)*>
<!ATTLIST SIG_IMAGE
        %rid;
        MimeType CDATA #REQUIRED
        Encoding CDATA #REQUIRED
        Href CDATA #IMPLIED
>
<!ELEMENT SIG_TEXT (#PCDATA)>
<!ATTLIST SIG_TEXT
        %rid;
>
<!ELEMENT SIG_OBJECT (#PCDATA)>
<!ATTLIST SIG_OBJECT
        %rid;
        MimeType CDATA #REQUIRED
        Encoding CDATA #REQUIRED
        Href CDATA #IMPLIED
>
<!ELEMENT SIG_AREAS (%SASblock;)*>
<!ATTLIST SIG_AREAS
        %rid;
>
<!ELEMENT SIG_ABOVE (#PCDATA | span)*>
<!ELEMENT SIG_BELOW (#PCDATA | span)*>
<!ELEMENT SIG_DATA (#PCDATA)>
<!ELEMENT SIGNATURES (SIG_DATA | SIG_TEXT | SIG_IMAGE | SIG_OBJECT | Signature)*>
```

*FIG. 6C*

ELECTRONIC DOCUMENT FOR MORTGAGE TRANSACTIONS

CROSS REFERENCE TO RELATED APPLICATIONS

This application claims priority under 35 U.S.C. §119(e) to U.S. Provisional Application No. 60/369,030, filed Apr. 1, 2002 and entitled "System, Specification & Tools for Creating Processing, and Validating Electronic Documents," which is incorporated by reference herein in its entirety.

BACKGROUND OF THE INVENTION

1. Field of the Invention

This invention relates generally to electronic documents, and more particularly to an electronic document for mortgage transactions.

2. Description of the Related Art

Information is being increasingly processed electronically in lieu of traditional paper processes. Electronic documents offer substantial benefits, such as cost reduction and the accommodation of rapid manipulation and organization of information. In addition to providing new benefits, electronic documents should be designed to at least provide the same level of usefulness as conventional paper documents. Specifically, laws and business customs variously address paper document concerns including authenticity (that a document is what it purports to be and has been actually signed by the appropriate entities), integrity (that a document is complete and unaltered), and validity (that a document complies with business and legal rules), and electronic documents should equal or exceed the level to which traditional paper document practices satisfy these concerns.

Although conventional electronic documents address some of the traditional paper document concerns, they remain problematic in several respects. One problem with electronic documents is that, although they are capable of being rapidly processed, they must still integrate with environments in which their content will need to be accurately and verifiably displayed (e.g., printed, rendered on a monitor, etc.). This is particularly true for mortgage transactions, where documents such as promissory notes are still routinely used in paper form during certain procedures, such as closings. Although the data contained on a printed document could be transferred to an electronic document, in many applications such an electronic document could not be properly validated due to the lack of adequate assurances that the data contained in the electronic document actually corresponds to the printed (or otherwise viewed) document used in an underlying transaction. The printed document could be manually compared to the data in the electronic document in order to validate the electronic document, but such a practice would negate many of the benefits of electronic processing. Alternatively, a conventional markup language could be used to define an electronic document having displayable information. However, in such a case the listing for rendering a display would contain a substantial amount of information not required for subsequent data processing. Moreover, the format of the listing might not be amenable to rapid and accurate processing in many circumstances, and might not be formatted for related transactions.

Another problem with electronic documents is the potential for document variation within an industry, as dictated by individual practices, or by the various conditions in which an electronic document might be processed. For example, in mortgage transactions, certain lenders may have a common set of requirements for document validity, but might supplement these with their own particular requirements. A conventional electronic document (e.g., an XML document) can have a specification, such as a document type definition (DTD) that identifies constraints used to determine whether the document is valid, such as whether it contains tags that are not permitted by the DTD. However, while checking for a set of known elements is known, such validation would be inadequate where divergent document requirements are encountered. Specifically, a document may be valid according to a DTD, but invalid according to the format and content required by a particular lender.

Still further, related transactions might use separate documents that contain some common information, but which are not necessarily identical. For example, in the real estate environment, multiple documents might contain overlapping data that should be consistently defined and conveyed throughout the various documents. Neither conventional paper documents nor conventional electronic documents adequately address these concerns, as there are often discrepancies between forms purportedly having identical overlapping information.

Thus, what is needed are electronic documents that accommodate verification that data to be processed corresponds to that on viewed documents, that allow data to be displayed according to consumer preferences, and that accommodate potentially divergent document and data requirements within an industry.

SUMMARY OF THE INVENTION

The present invention provides an electronic document that accommodates determinations of authenticity, integrity and validity through various transactions. Although applicable in other environments, the electronic document is particularly useful for mortgage transactions.

In one embodiment, the electronic document includes a view section, a main data section and a linking section. The main data section provides the main data that is typically processed, and thus separately parsed, in transactions involving the electronic document. The view section includes presentation formatting for providing a display corresponding to the main data. The linking section provides linking elements that identify corresponding main data values and view data values respectively used to populate the main data and the display provided by the view section. The linking elements are accessible for determining whether the main data section matches the view section for the particular informational field, providing assurances that processed data matches that viewed by parties to a transaction.

For a given informational field contained in both the view and the main data, a linking element identifies a main data value and a view data value. These values can be subsequently compared for the matching determination. Although the data values may be contained within the linking section, they are preferably referenced by pointers to locations within at least one of the view and main data sections. There may be separate linking elements for each of the set of values, or other configurations. For example, where a view data value appears numerous times in a viewed document, a single linking element can be used to verify matching to a main data value in each of numerous instances. The linking elements can also reside in a common location, for improved access during electronic document validation, and may further reside in the main data section.

In another embodiment, the electronic document includes a signature section usable to store various types of signatures, including electronic and digital. Signatures can be included as mere information indicating that the electronic document had been signed, or may be integrated with the electronic document in a fashion that furthers document security and integrity. For example, a given digital signature can be stored in the electronic document and used to wrap that data and view sections, to ensure that they were not altered since application of the given digital signature to the electronic document.

In still another embodiment, the electronic document includes a header section including document type and state information. This information can be updated to reflect the content of the electronic document, or changes to the electronic document modifying or affecting such content. The information is readily accessible so that recipients of the electronic document can review the header information to identify information about the content and status of the electronic document without requiring them to otherwise analyze or review the electronic document.

BRIEF DESCRIPTION OF THE DRAWINGS

These and other more detailed and specific features of the present invention are more fully disclosed in the following specification, reference being had to the accompanying drawings, in which:

FIG. 4 illustrates an example listing for an unsigned sample electronic document;

FIGS. 5A and 5B illustrate an example listing for a signed sample electronic document;

FIGS. 6A, 6B, and 6C illustrate a sample format for an XML DTD file for an electronic document;

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
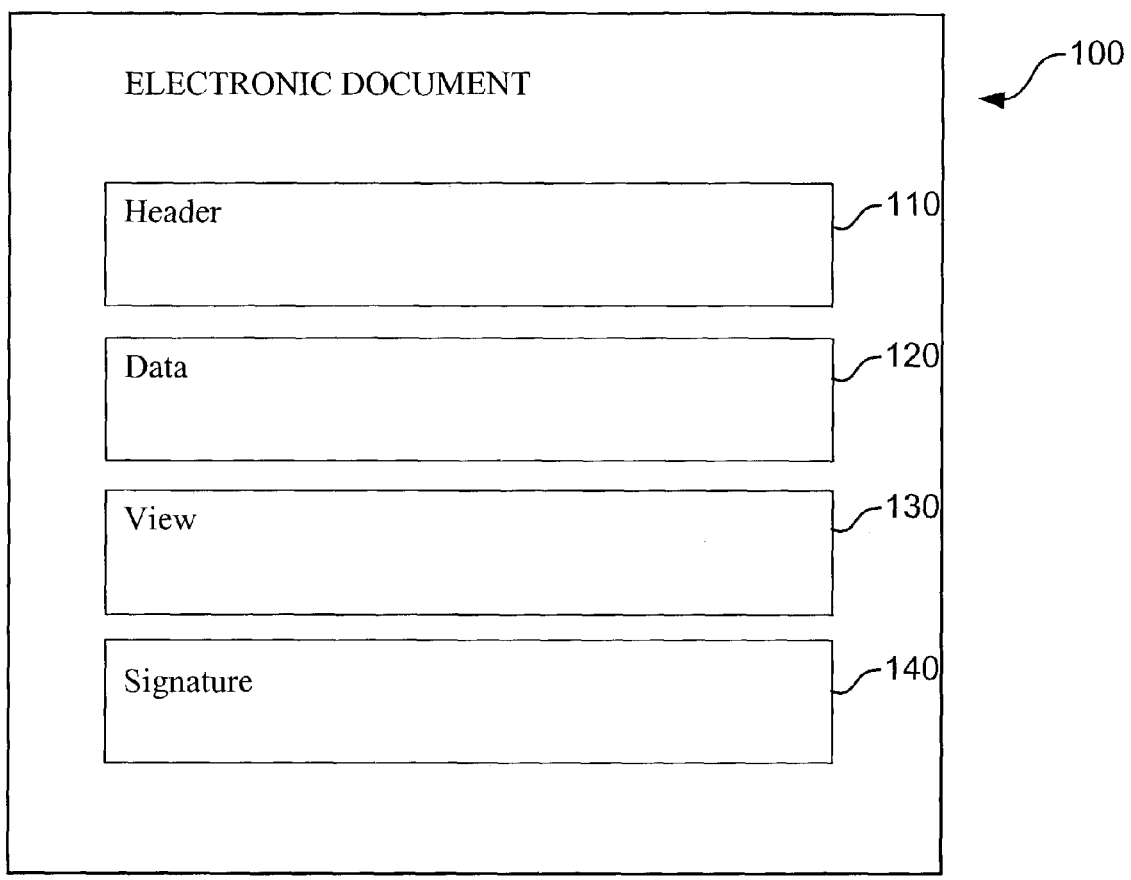
FIG. 1 is a block diagram illustrating an embodiment of an electronic document in accordance with the present invention.

FIG. 1 is a block diagram illustrating an embodiment of an electronic document 100 in accordance with the present invention. The electronic document 100 has a modular configuration including a header section 110, a data section 120, a view section 130, and a signature section 140.

The electronic document 100 is preferably defined using a mark-up language, such as the one described further below. The electronic document 100 may be used in various systems, including a computer network, including but not limited to private networks, the Internet, a local area network, and others, and may be stored on various media including but not limited to a hard disk, floppy disk, tape or compact disc. In one embodiment, validation of the electronic document 100 is variously helpful in originating, closing and delivering loans to an investor in what is referred to as the secondary mortgage market. Although mortgage transactions are described, embodiments of the present invention are also applicable elsewhere, such as for any transactions requiring a transition from static paper-based documents to an electronic format.

Preferably, the electronic document 100 facilitates tamper-proofing (e.g., ensuring that a document is not altered), non-repudiation (e.g., evidencing that a document was signed by a particular entity at a particular date and time), field validation (e.g., checking that information in a document complies with content category rules), logging (e.g., recording actions performed on the document, with actor identification), access-control (e.g., facilitating prevention of unauthorized users from accessing the document), and self-sufficiency (e.g., avoiding reliance on external software). These and other features, and corresponding validation, are described further below.

In certain applications, it might be desirable to strip one or more of header 110, data 120, view 130 and signature 140 sections from the electronic document 100 to facilitate processing, display or transmission. For example, an electronic document that is only intended for machine processing may at times only include the header 110 and data 120 sections. Likewise, an electronic document that is only intended for viewing may not contain a data 120 section (e.g., a billing statement emailed to a client). In addition, it may be desirable to replace the view 130 section with viewable electronic documents in other formats such as a PDF or an image file. Having independent data and view sections is helpful for providing flexible document structures.

Still referring to FIG. 1, the header section 110 contains information about the document itself, such as its version, the type of document (promissory note, trial transcript, etc.) and whether or not all parties have signed. The data section 120 contains the information corresponding to that originating from an equivalent paper document, such as data from a promissory note. It may also contain some non-viewable information pertaining to transactions. The view section 130 contains tags that describe how to format and present the data contained in the document. Links connect the unformatted information in the data section 120 to the corresponding formatted information in the view section 130. The header 110 and data 120 sections are preferably written in extensible markup language (XML) and the view section 130 is preferably written in extensible hypertext markup language (XHTML), which are conventional languages for creating electronic documents, although various alternative languages may be utilized. Although a single data 120 and view section 130 pair is shown, these sections can be provided in various combinations, as described further below. Generally, there may be various pairs of data and view sections for a plurality of documents defined by the electronic document, or plural view sections sharing a common data section, or other combinations.

The signature section 140 is optional, and provides the electronic and/or digital signatures for the electronic document. A preferred signatures section 140 includes four components: (1) the signers of the document, their roles and order of signing the electronic document 100; (2) for unsigned documents, signature templates that indicate where signatures are to be applied in the document, the relationship between the signer and the placeholder and how the components of a signature are presented to the signer; (3) for signed documents, a representation of the signature in either digital or electronic form and its relationship to the signer; and (4) for documents with a tamper seal, an XML digital signature verifying the content of the electronic document 100 represented in an XML digital signature. Significantly, some signatures may also reside in the view area.

The electronic document 100 also includes an audit trail section. This section can be independent, or part of one of the other sections, such as the header section. The audit trail section is used to log actions performed on the document, identify the person or system taking those actions, and to identify next actions for use in workflow management.

XML allows information to be structured and classified so that it is easy to tell the difference between pieces of information (e.g., a lender's telephone number, and a borrower's zip code). Particularly, XML defines the structure and classification of information in tags or elements. These tags or elements are integrated within the information itself. XML markup tags such as <LENDER> and <BORROWER> easily identify important and meaningful information about the content of the electronic document. The names of the tags and the structure of XML documents are defined by a document type definition (DTD). The DTD associated with a particular electronic document describes the tags or markup and the structure of the document, and specifies which tags contain other tags. For example, the XML tag <PROPERTY> might contains four tags <StreetAddress>, <City>, <State>, and <PostalCode>.

The World Wide Web Consortium (W3C) is the organization responsible for the XML standard, DTDs and related standards (http://www.w3.org). Notwithstanding the reference to DTDs to define the structure of XML documents, it should be understood that other specifications, methodologies, systems, protocols, or schemes could define the structure of markup languages.

Hypertext Markup Language (HTML) is the set of codes in electronic documents that allow the documents to be displayed by a World Wide Web browser. HTML documents describe the presentation of information, such as on a computer screen. HTML is related to XML; however, an HTML document is not an XML document. The W3C is also maintains the HTML standard. XHTML is essentially a reformulation of HTML that is intended to provide users with some of the functionality, extensibility and versatility of XML while maintaining the ability to display documents in a web browser. An XHTML document is an HTML document that can be viewed as a web page and can be processed by XML software. They are readily viewed, edited, and validated with standard XML tools. The can often be viewed using conventional HTML browsers, or more robustly using XHTML conforming browsers.

XHTML allows the comingling of user-defined XML tags within presentation elements. For example, in the following line of XHTML: <b> <BORROWER_NAME> Joe Smith </BORROWER_NAME> </b>, a BORROWER_NAME element is nested within a "b" element, which stands for "bold". Thus, the XML tag, "BORROWER_NAME", describes the contained data while the presentation tag, "b", instructs the browser on how to present the contained data (the presentation will not include any markup tags).

While XHTML is more robust and can provide the user with information concerning the data via the descriptive tags, XHTML constrains the form of the XML tags that can be embedded in the document, and requires presentation and XML data to take the same form, even if an alternate form is more suitable for later machine processing. It is therefore preferred to separate the XML tags that make up a document's structure (also called a model) from the document's presentation (also called a view).

Figure 2:
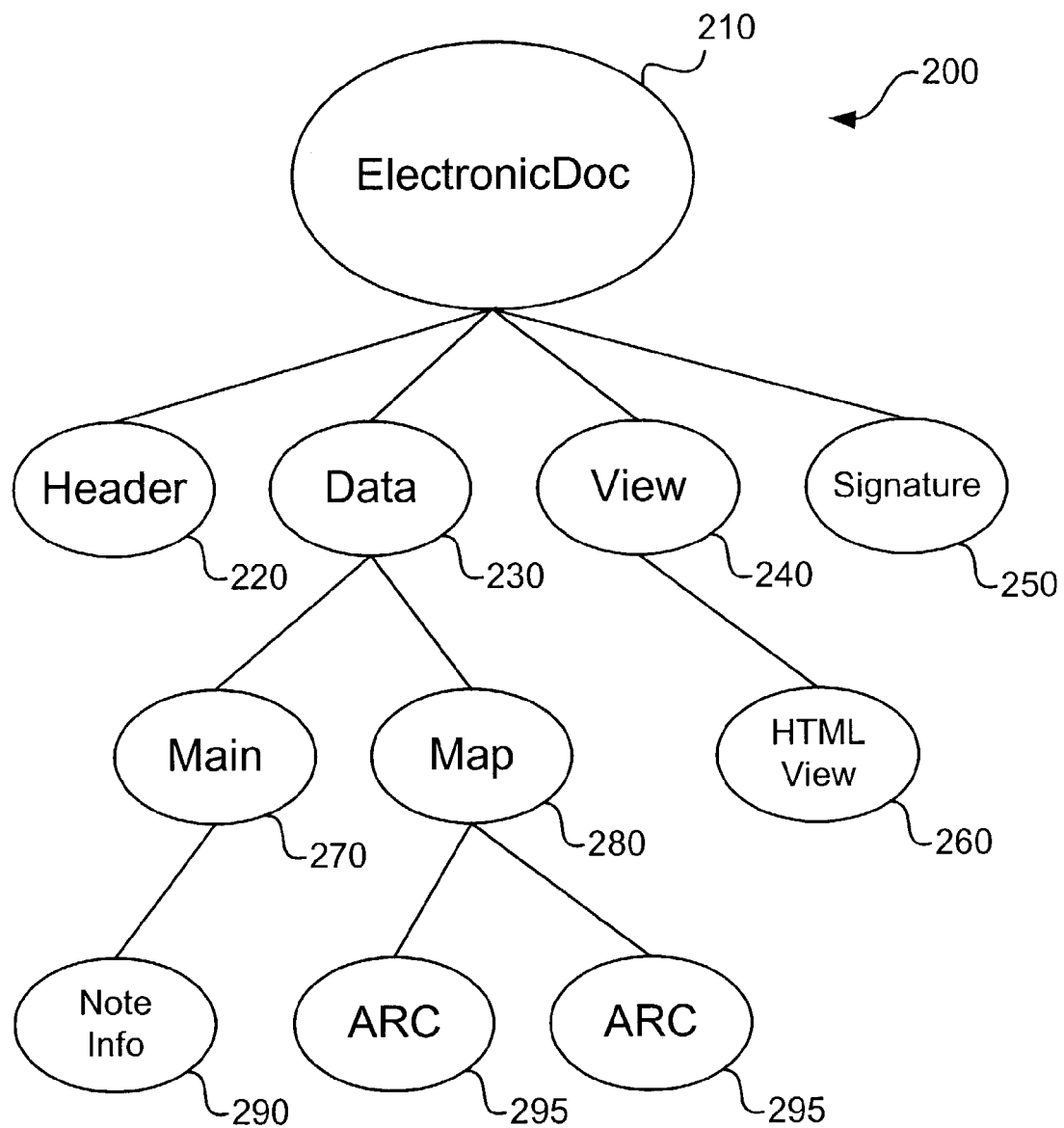
FIG. 2 is a schematic diagram illustrating the structure of the electronic document shown in FIG. 1.

FIG. 2 is a schematic diagram illustrating an embodiment of the architecture for an electronic document 200 in accordance with the present invention. The electronic document 200 includes a root element ElectronicDoc 210 having four sub-nodes or children elements: Header 220, Data 230, View 240 and Signature 250. The View element 240 has a child HTML View element 260, and the Data element 230 has two children elements, Main element 270 and Map element 280. In turn, the Main element 270 has a child element Note Info 290 and the Map element 280 has two ARC elements 295. Following are examples of electronic documents defined according to this architecture.

Figure 3:
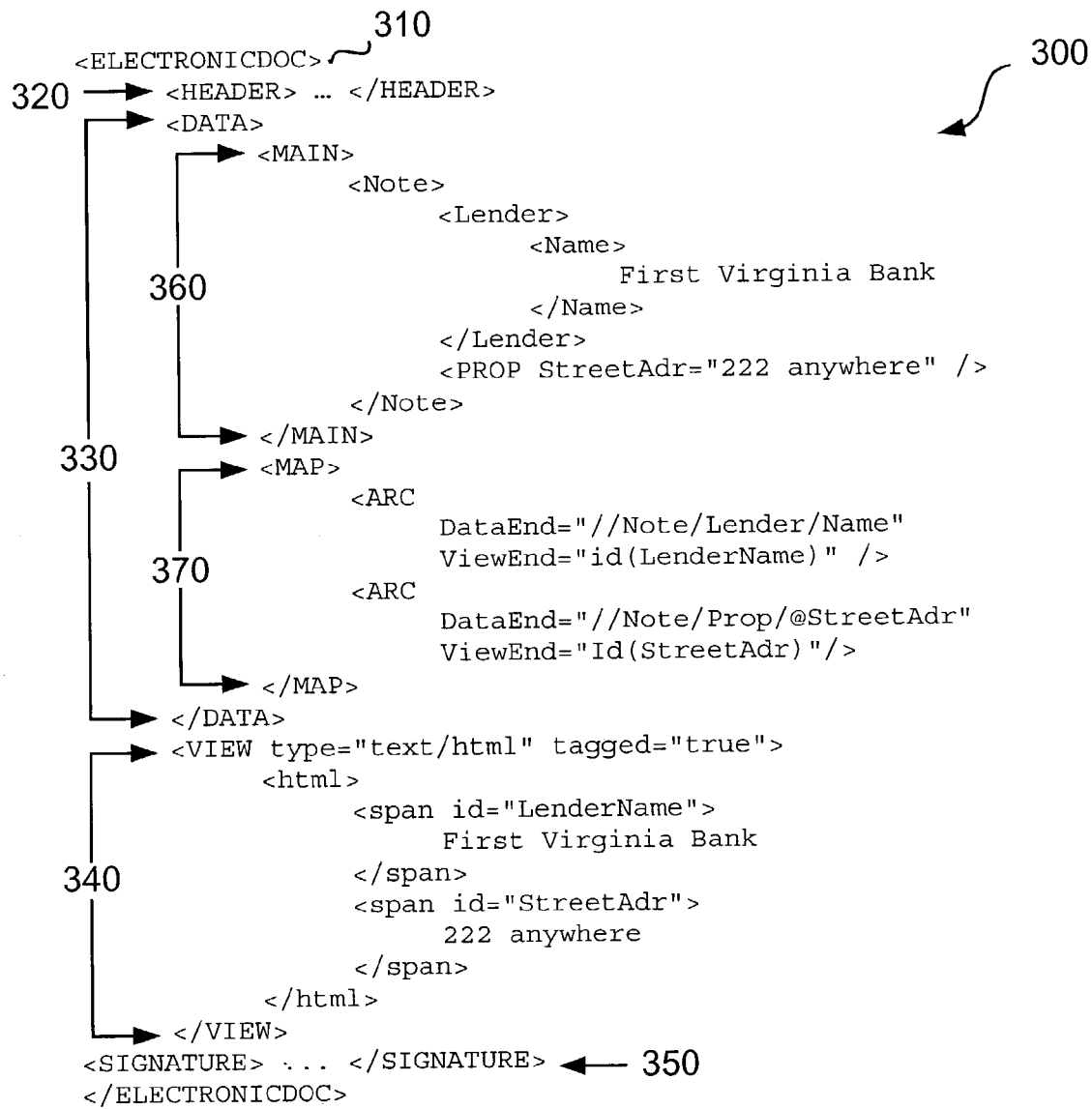
FIG. 3 illustrates an example listing for an electronic document in accordance with the present invention.

FIG. 3 illustrates a sample listing for an XML/XHTML based electronic mortgage document 300 in accordance with the architecture of FIGS. 1 and 2. Although an electronic mortgage document is shown, the present invention is equally applicable to other environments. The sample listing for the electronic document 300 includes the root element which is the ELECTRONICDOC element 310 contained between the opening tag <ELECTRONICDOC> and closing tag </ELECTRONICDOC> and its four children elements (HEADER, DATA, VIEW and SIGNATURE) that demarcate the sections of the document: the header section 320, the data section 330, the view section 340, and the signature section 350. Specifically, the header section 320 is between opening and closing tags <HEADER> and </HEADER>, the data section 330 is between opening and closing tags <DATA> and </DATA>, the view section 340 is between opening and closing tags <VIEW> and </VIEW> and the signature section 350 is between opening and closing tags <SIGNATURE> and </SIGNATURE>. The view section 340 is further subdivided into a main section 360 and a map section 370.

Figure 5B:
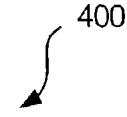

FIG. 4 illustrates another example of a listing for an electronic document 400, and is shown in the unsigned state, having a header section 410, data section 420, view section 430 and signature section 440. The listing for the same electronic document 400 is shown in the signed state in FIGS. 5A and 5B. The individual sections shown in FIGS. 4, 5A and 5B are discussed further below.

1. The Header Section

Preferably, the header section 420 and data section 430 are written in XML, and the view section 440 in XHTML. The header section 420 contains information about the electronic document 400 such as type, state, signature, and access information. Presenting information identifying the characteristics of the electronic document in the header section 420 allows easy determination of the content of the document 400 without having to access and analyze the main data for such determinations.

A preferred HEADER element includes NAME, AUDIT_TRAIL, SIG_MODEL element, and may further include an ACCESS_CONTROL element.

The NAME element contains information about the document's class, state, and process properties. The attributes include Type, State, Negotiable, and MustBeRecorded. The Type attribute defines the type of document(s) that the electronic document 400 defines. It can be a single document, such as a "Note" as shown. It can also be an enumerated list. Options for the type of document will vary based upon application. For mortgage transactions, the available types include Note, Addendum, Security_Instrument, Assignment, Rider, Disclosure, TIL, Itemization, RightToCancel, HUD-1, RESPA, Closing Instruction, PaymentLetter, BorrowerAffidavit, Insurance, Lender, Investor, LoanModification, DeedOfTrust, and Other. The header identifies various electronic document characteristics.

The state preferably defines the document's current stage in the document lifecycle. Although various state values may be applied, in one embodiment, they include "unpopulated," wherein the document has an unpopulated data section and unpopulated and unsigned view; "populated," wherein the document has been completed with data; "signable," wherein the document is populated with data that specifies all of the proposed signers and contains placeholders for signature lines; "signed," wherein the electronic document has all of the signatures for all signers, with the exception of the recorder, and the document is tamper sealed; "recordable," which is a stage wherein the document is in a combination of signed and unsigned states, occurring when a borrower and/or notary have signed the document and it is presented for a recorder's signature; "recorded," wherein the document has all of the signatures for all signers including the recorder and is digitally tamper sealed; exported, wherein a document that is a copy or a view of an archived document is exported, while the original electronic document remains stored as an immutable archived copy; and "voided," wherein a signed or recorded document no longer has legal effect. These meta-information sub-elements and attributes are contained within the HEADER element, as shown in FIGS. 4 and 5A. Specifically, in FIG. 4 the state is indicated as "signable" and in FIG. 5A the state is indicated as "signed" since at least one person has signed the electronic document 400. Of course, the meaning of "signed" might require more than one signature to adopt that state. For example, the "signed" state might require all parties to the transaction to have signed the electronic document, including a tamper seal based signature.

Regarding the remaining attributes, the Negotiable attribute indicates whether the electronic document is a negotiable instrument or not, and the MustBeRecorded attribute is a Boolean attribute that indicates whether the electronic document must be recorded.

The AUDIT_TRAIL element contains a log of all of the actions that have been performed on the document, recording the party who performed an action, the action performed and the date and time of the action. This is useful for workflow management and for review of actions performed on the electronic document. As with the header generally, providing a specific area to inquire about audit trail information is useful in its provision of information in a well defined area, for easy determinations about type, state, and other information. In the illustrated example, the audit trail information reveals that a party denoted Joe Smith created an electronic document template, and then that a "Doc Prep" party populated the document and placed it in condition for signing (according to the above described states).

The SIG_MODEL element connects signers, targets and signatures. The illustrated element includes attributes indicating signer areas, role, targets, and tamper seal information. These attributes are described further in connection with the signature section, below.

The ACCESS_CONTROL element lists the classes of entities that may access the document. Attributes can define particular classes of entities (e.g., Lender, Notary, ClosingAgent, etc.), corresponding permissions (e.g., edit; read only; etc.), and targets for those permissions (e.g., a particular View; the entire document; etc.).

Other elements can also be provided to identify information about the electronic document. For example, a HEADER element ID can also be provided to uniquely identify the header element within the document.

2. The Data Section

The data section 430 contains the typically processed data for the electronic document (e.g., loan amounts, loan type, loan term lender's name, borrower's name and property address). Because the data section 430 does not typically contain format information, repetitions of data or lengthy signature information, it usually requires less storage than the view section 440 and the signature section 450 (the data section 430 often comprises less than fifteen percent of the electronic document). Providing the separate data section 430 is helpful to processing because computational resources are not dedicated to searching through the entire document for data, or separating data from view information.

The data section 430, which is demarcated by the DATA element, is further subdivided into a main section 460 and a map section 470 demarcated by the MAIN and MAP elements, respectively. The main section 460 contains the data model that is the XML structural description of the electronic mortgage document, which includes the XML elements corresponding to the elements in the DTD, an example of which is shown in FIG. 5. In the illustrative mortgage environment, the MAIN element comprises LOAN (the terms and features of the loan, e.g., the interest rate and loan amount), BORROWER (information about the borrower), LENDER (information about the lender), PROPERTY (information about the property which is the subject of the mortgage), and EXECUTION (information about the date and location of the execution of the note) elements.

The map section 470 links structural fields in the data section 430 to presentation fields in the view section 440. A map section 470 is used with a "tagged" view in order to link the variable data fields in the view section 440 to their counterparts in the main section 460 (which contains the XML data elements). There should be one MAP element for each view that a DATA element is linked to. For example, if an electronic document contained three different view sections representing the data from a single data section, there would be three corresponding MAP elements within the DATA element.

The MAP element includes ARC elements that link values in the view section 440 to those in the data section 430. These may also be referred to as linking elements. There are various ways that the linking element can reference the necessary values. For example, the illustrated ARC elements include a pointer to a field in the data section 430 (in an attribute called DataEnd) and a pointer to a field in the view section 440 (in an attributed called ViewEnd). Preferably, the format of these pointers conforms to the conventional W3C XPATH specification, although various alternatives can be provided and the present invention is not limited to this language or format.

ARC elements may be used for one-to-one mapping, one-to-many mapping, one-to-one data type conversion and one-to-many data type conversion. A single ARC element is used to create a one-to-one map. One way to create a one-to-many mapping uses multiple ARC elements, one for each data-to-view linkage. In this example, if an electronic document displays the first name of a borrower five times, then the MAP element contains five ARC elements, each linking the borrower's first name field from the data section to an instance of the name in the view section 440.

The format for a value displayed in the view section 440 will often differ from that in the data section 430. For example, a date may be represented numerically in the data Section 430 (e.g., "8/30/75") and in text form in the view section 440 (e.g., "Aug. 30, 1975"). When validating the document, it is helpful to convert the data into the same format for comparison (e.g., to ensure that corresponding values for fields in the view and data sections are identical).

When it is necessary to perform a data conversion, the ARC element is paired with a CONVERT element, which facilitates conversion of data types so that they are similarly formatted for comparison purposes. Various pairing configurations can be used. For example, ARC elements can be contained by a CONVERT element (typically for group conversions) or can contain a CONVERT element (typically for single conversions). The CONVERT element has three attributes: the name of the conversion process, the data type of the data in the data section, and the data type of the data in the view section. Various conversion processes can be applied. For example, the process called "ConvertType," transforms decimal numbers into text. This would be used to compare a numerical data section value (e.g., loan principal is "125000.00") with a text based view section representation (e.g., loan principal is "One Hundred Twenty Five Thousand.") Many conversion processes use masks to specify how a data field is to be compared with a data field formatted for presentation. For example, if "#" indicates an optional digit, then the following mask "$ ###,###.##" would convert 125000.00 into "$ 125,000.00."

For one-to-many data conversions, the CONVERT element contains a set of ARC elements. This allows for a conversion to map several input data fields to a single output presentation field (e.g., take a separate day, month, and year field to generate a single date display) or to map one data input field to many output presentation fields (e.g., represent the loan principal amount both numerically and in text-form in the view section).

An optional OPERATOR element may be used to specify different types of allowable conversions on data for different presentations. This optional element allows several ARC elements to be combined in Boolean fashion (i.e., with AND or OR).

A DATA element can also contain a CUSTOM element. The CUSTOM element provides users with an area to place proprietary data, new requirements data or anything that a particular system may need that does not "fit" anywhere else. As with all the XML elements, the scope of the data acceptable via the CUSTOM element is defined in the DTD. The DTD defines the scope of user-defined and user-named sub-elements to the CUSTOM element. Preferably, the CUSTOM element sits outside the MAIN element because it is designed to contain proprietary or ad hoc data.

3. The View Section

The view section 440 includes data corresponding to that contained in the XML data section 430 along with information on how to display the data. Typically, the view section and the displays created thereby are considered to be the legally binding portion of the electronic document, so the data section can be said to contain copies of data found in the view section. The view section 440 can contain multiple views, each implemented by a pairing or linking of visual formatting information and data. DATA and VIEW elements may be present in various combinations. There can be multiple pairings of DATA and VIEW elements, and multiple VIEW elements may be paired with a single DATA element.

As discussed above, the map section 470 contains the explicit links between structural fields in the data section 430 and presentation fields in the view section 440. The map section 470 is used with a "tagged" view in order to link the variable data fields in the view section 440 to their counterparts in the main section 460 (which contains the XML data elements).

The XHTML views are "tagged" by marking the variable fields. Particularly, a SPAN or DIV element can be used to tag variable data fields. The SPAN element used in this example has an ID attribute with a unique ID that can be referred to by an ARC element in the map section. As discussed above, ARC elements contain a pointer to a field in the data section 430 (in an attribute called DataEnd) and a pointer to a field in the view section 440 (in an attribute called ViewEnd). Thus, the SPAN (or DIV) element is used to envelop the data field in the view section, and to uniquely identify it using an ID attribute.

4. The Signature Section:

The signature section 450, shown in FIGS. 5A and 5B, ensures the authenticity and integrity of the electronic document 400. Various signatures, including digital and electronic signatures, may be used. For digital signatures, a Signature element according to the W3C XML Signature specification is preferably used. For electronic signatures, there are three types of signature elements: SIG_IMAGE, SIG_TEXT, and SIG_OBJECT. The SIG_IMAGE element corresponds to a locally encoded image of the person's signature or a holographic signature. The SIG_TEXT element refers to a string of text inputted by the signer. If the SIG_TEXT element is within a viewable HTML view, the text will appear. Outside of the SIG_TEXT element an application is free to style the signed text with an enclosing SPAN tag. Lastly, a SIG_OBJECT element corresponds to any external object code to be presented as an electronic signature. This would correspond to an HTML embed tag for the specific purpose of presenting a captured signature (e.g., a form of a biometric signature).

To understand the signature section 450, reference is now made to FIGS. 4, 5A and 5B which depict the listing for the electronic document 400 in the unsigned and signed states. As shown in FIGS. 4 and 5A, the header section 410 includes a SIG_MODEL element. The view section 430 contains a SIG_TARGET element and a SIG_LINE element within the VIEW element. As this listing demonstrates, parts of the signature section 450 are actually implemented within the HEADER and VIEW elements.

The <SIG_MODEL> element defines signatures provided in the electronic document and accommodates the transition from a signable state to a signed state. For each signature that is applied to the electronic document 400, the SIG_MODEL element will contain a SIGNER element. A corresponding SIG_TARGET element will exist in the view section 440 between the <VIEW> opening tag and the <VIEW> closing tag. The SIGNER and SIG_TARGET elements describe how a particular signature is to be applied to the electronic document 400.

The SIGNER elements have the following attributes: Role (defines which class of users may sign in a particular area), Roleorder (the order in which the signature should be applied relative to other signatures on the document), Type (the type of signature that will be used, e.g., digital or biometric signature), Targets (the particular SIG_TARGET within a VIEW element that is to be signed), Area (the specific SIG_AREA elements to which this SIGNER refers), Areas (the specific SIG_AREAS elements to which this SIGNER refers), Data, and Signature (the specific signature elements (electronic or digital) this SIGNER refers to).

In electronic document 400, the SIG_MODEL indicates that its corresponding SIG_TARGET will be electronically signed by a borrower, that the signature will be in text form, that it should be signed before all other signatures are applied, and that the electronic signature will be stored at the SIG_LINE with the unique identifier "BorrowerArea01." In addition, a tamper seal is applied in the form of a digital signature having as its target the entire view section identified by the unique Id "View01." The tamper seal wraps the entire view including the first applied electronic signature of the borrower.

More specifically, as shown in FIGS. 4 and 5A, the view section 440 contains the SIG_TARGET element which has the unique identifier "Borrower01." Within the SIG_TARGET is the area to be signed using the designated signature type (e.g., electronic or digital), which includes the HTML HEAD and BODY elements. The BODY element contains the text of the note and a SIG AREAS element. The SIG_AREAS element holds all of the SIG_AREA elements for the View Section (although in this example there is only one SIG_AREA, "BorrowerArea01"). There should be one SIG_AREA for each signature that will be placed on the document. The SIG_AREA includes SIG_ABOVE (the text that goes above the signature line), SIG_LINE (the actual text representation of the signature line, which in this case is a long underscore line), and SIG_BELOW (the text that goes below the signature line). In the present example, the SIG_MODEL element indicates that this information located between the <SIG_TARGET> opening tag having the identifier "Borrower01" and the <SIG_TARGET> closing tag will be electronically signed by the borrower, Rebecca Kate Thornton, using a text-based signature.

When the electronic document 400 is signed, the SIG_MODEL element, the SIG_TARGET element and the SIGNATURE element are modified. The SIG_TARGET element of the VIEW element is modified to depict a document where the borrower's full name has been filled in. Since the Type attribute of the SIGNER element indicates a text signature for the borrower, the SIG_LINE element is replaced by the SIG_TEXT element which contains the actual electronic signature (in this case the underscore shown in FIG. 4 is replaced with "eSigned by Rebecca Thornton at 3:46 on Nov. 16, 2001" as shown in FIG. 5A).

The SIG_MODEL element also includes a Signature="TamperSeal01" to serve as a pointer to the signature. Once the electronic document has been signed, a SIGNATURE element is added which contains tamper sealing information in the form of an encrypted hash of the document. As shown in FIG. 5B, the digital signature tamper seal is performed using a standard PKI method. Both the digest or hash value and the key value are included between the <SIGNATURE> tags. The actual digital signature value (i.e., the value generated by encrypting the message digest with the private key is stored between opening and closing <SignatureValue> tags shown in FIG. 5B. In addition, the digital certificate including the public key of the private-public key pair is stored within the signature section 450.

Figure 6B:
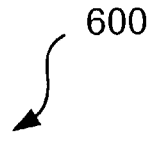

FIGS. 6A, 6B, and 6C illustrate a sample format for an XML DTD file for an electronic document. The DTD includes conventional commentary syntax for explaining the function of various sections of the DTD file. The beginning of a comment is signified by "<!--" and the end of a comment is signified by "-->." "|" represents the logical expression "or," "?" signifies an optional element (zero or one of the element may be present), "*" signifies zero or more, and "+" signifies one or more.

The DTD 600 also contains Entity definitions that define the members and structures of groups. For example, the Role definition lists the various recognized roles: borrower, lender, notary, closing agent, recorder, grantor, assignor and other. The Boolean definition lists the recognized values for a Boolean, which are "true" and "false." The <ELECTRONIC DOC> element is the root of the document. The DTD specifies that electronic document 600 may contain more than one view and that the data section is optional. This means that there can be various configurations such as a header and a data section; or a header and a view; or a header, data and one or more views. This flexibility is useful for a set of mortgage documents to be packaged together where all documents do not require tagged views. The elements described in connection with the electronic document are generally provided, either directly or referentially, according to the DTD 600. Again, this DTD 600 merely suggests one possible format, and the ordinarily skilled artisan will recognize the various different options for providing an electronic document DTD according to required business practices for each particular electronic document.

Figure 7:
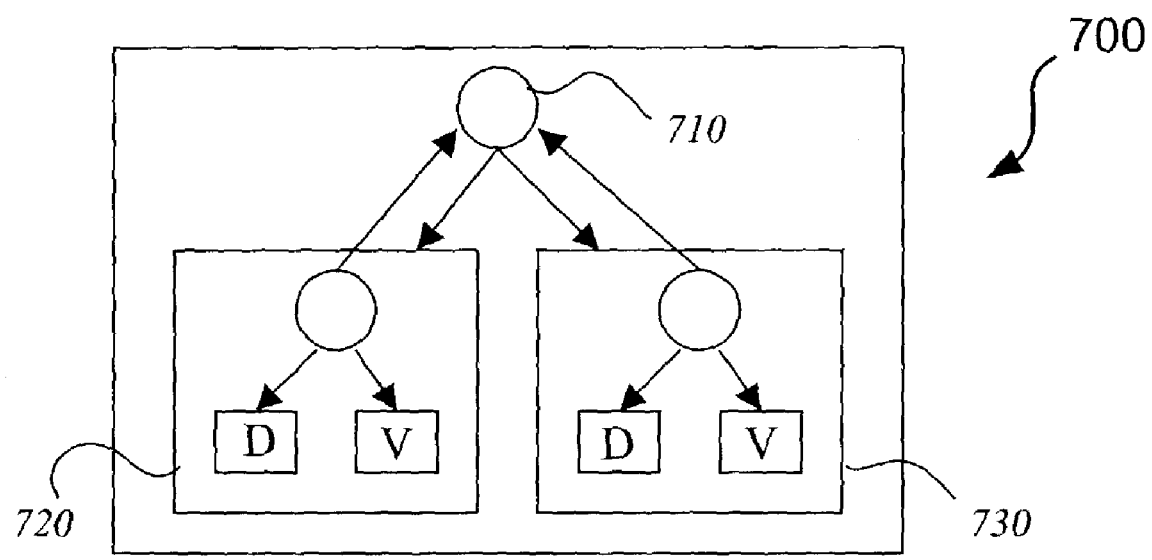
FIG. 7 is a block diagram illustrating the structure of a delivery package JAR file.

Although the electronic document can be variously embodied and stored, it may be arranged for storage according to the JAR archive file format (i.e., Java™ .jar file format). This allows the bundling of multiple documents into a commonly archived file that can be digitally signed. For example, FIG. 7 is a schematic diagram illustrating the basic architecture for a delivery package 700 within a JAR file containing an electronic document representing a Note 720 and an electronic document representing an Assignment 730. The Note 720 and the Assignment 730 are preferably XML files. The Note 720 points to the JAR delivery package represented by the circle 710 as its parent, and to its data section "D" and view section "V" as parts. Similarly, the Assignment 730 points to the JAR delivery package represented by the circle 710 as its parent, and to its data section and view section as parts. The JAR delivery package 710 does not point to a parent (because it is not a sub-part of any file) and points to the Note 720 and the Assignment 730 as its parts. This allows for a clean separation of data components for storage in multiple configurations, and assigns labels for software programs to process the individual parts and aggregation of parts correctly. Various alternatives to the JAR file format can be provided, such as including files in a .zip file or using a conventional XML packaging format.

Figure 8:
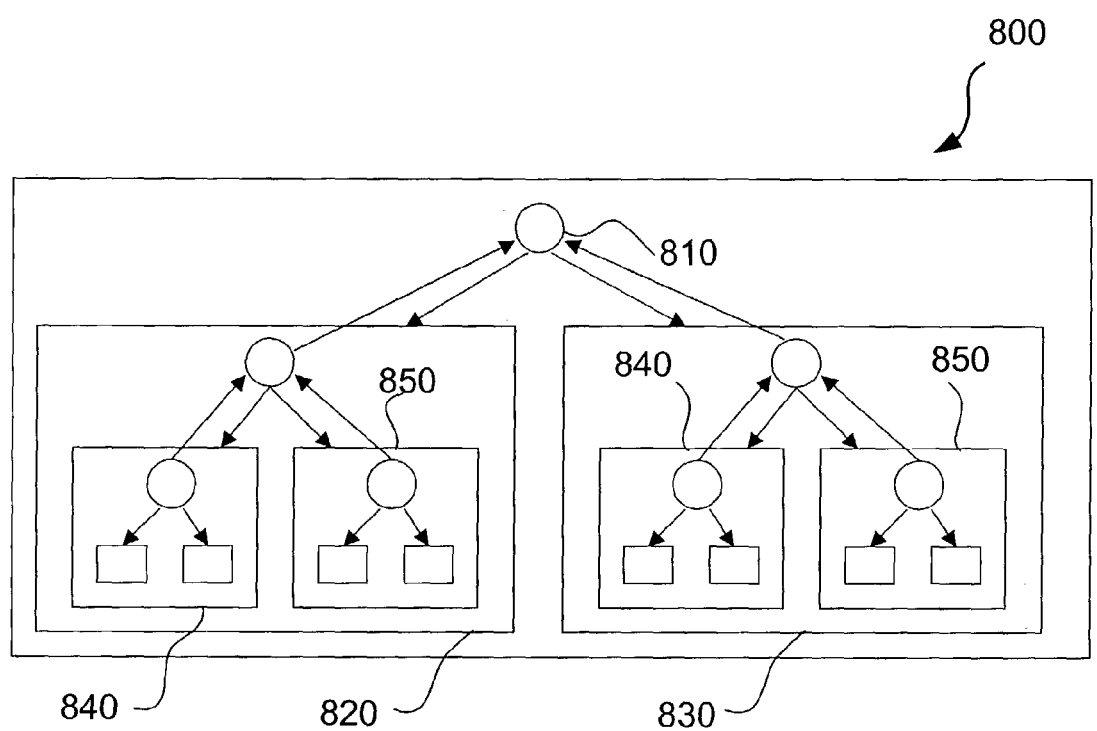
FIG. 8 is a block diagram illustrating the structure of a set of loans JAR file.

FIG. 8 is a schematic diagram illustrating a JAR set of loans package containing multiple loans. The JAR package for the set of loans 800 contains multiple JAR delivery packages 820, 830, each of which contains a Note electronic document 840 and an Assignment electronic document 850. Each of these JAR delivery packages 820, 830 points to the set of loans JAR file represented by the circle 810 as its parent. The set of loans JAR file 810 points to the delivery package JAR files 820, 830 as its parts.

Figure 9:
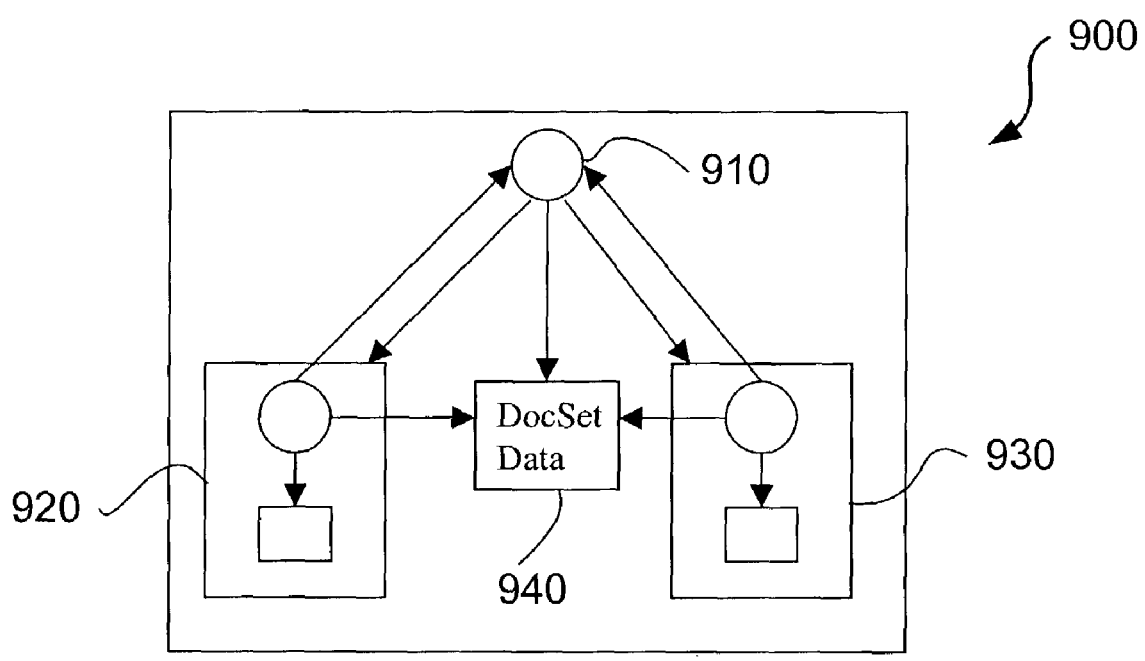
FIG. 9 is a block diagram illustrating the structure of a closing package JAR file.

FIG. 9 illustrates the structure of a closing package JAR file having a shared data section. The closing package 900 contains two XML electronic documents 920, 930, both of which share the same data section 940. Each document 920, 930 within the closing package 900 contains a view section, which it points to as a part, and points to the closing package represented by the circle 910 as a parent. The document 920 (or 930) and the closing package 900 all point to the data section 940 as a part. This structure allows multiple related documents to share their data sections or portions of their data sections. This ensures the integrity of the entire package, by eliminating the possibility of inconsistency between the various documents in the package.

Conventional validation procedures and techniques may be applied to the electronic document described in connection with the present invention. As discussed above, the electronic document separates format information from the underlying data, providing separate data and view sections. Validation may thus be used to ensure that view data matches the main data used for processing transactions in connection with the electronic document. Validation may include conventional baseline validation, incorporating standard XML parse validation that determines whether an XML document conforms to its DTD definition, followed by any other desired custom validation, including those that implement the above described CONVERT elements to accommodate data and view section comparisons, and additional structural rules (e.g., determining that a loan element must contain a balance field and an interest field). One example of validation is described in related application Ser. No. 10/339,775, filed on Jan. 9, 2003 and entitled Electronic Document Validation.

Figure 10:
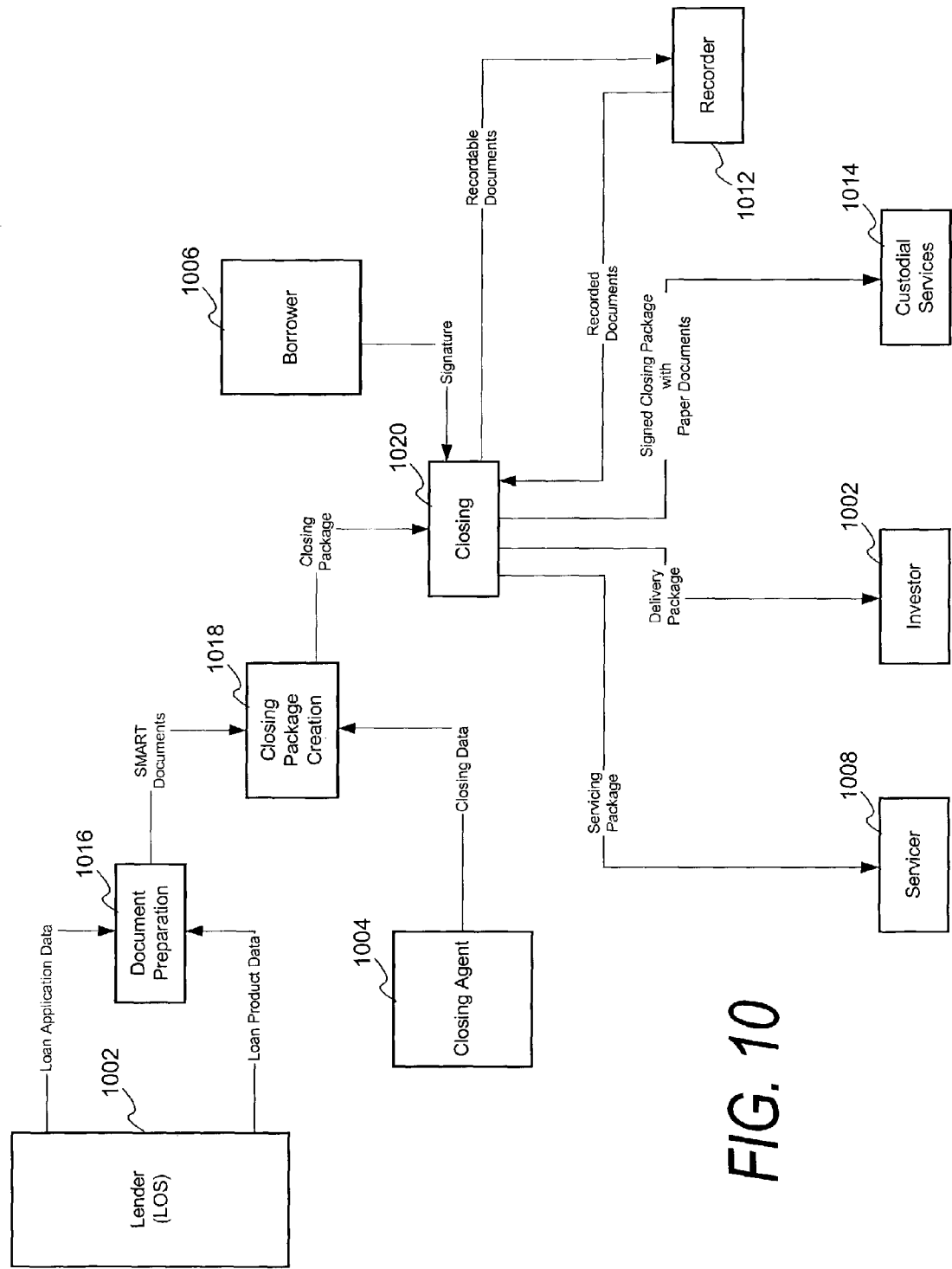
FIG. 10 is a schematic diagram illustrating the life cycle of electronic loan documents in a mortgage transaction including some post closing activities.

FIG. 10 is a schematic diagram illustrating an example of a portion of the life cycle of loan documents in a mortgage transaction. The participants in the illustrated process are the Lender (represented by the loan origination system 1002), closing agent 1004, borrower 1006, Servicer 1008, Investor (Secondary Market Source) 1002, County Recorder 1012 and Note Registry 1014. Each of these parties 1002-1014 can communicate over a computer network to transmit or receive an electronic document in accordance with the present invention.

Particularly in the application to mortgage transactions, the electronic document 100 will progress through various states in its lifecycle. As described above, these states include unpopulated, wherein the document has an unpopulated data section and unpopulated and unsigned view; populated, wherein the document has been completed with data; signable, wherein the document is populated with data that specifies all of the proposed signers and contains placeholders for signature lines; signed, wherein the electronic document has all of the signatures for all signers, with the exception of the recorder, and the document is tamper sealed; recordable, which is a stage wherein the document is in a combination of signed and unsigned states, occurring when a borrower and/or notary have signed the document and it is presented for a recorder's signature; recorded, wherein the document has all of the signatures for all signers including the recorder and is digitally tamper sealed; exported, wherein a document that is a copy or a view of an archived document is exported, while the original electronic document remains stored as an immutable archived copy; and voided, wherein a signed or recorded document no longer has legal effect.

Loan documents are prepared via a lender's loan origination system (LOS) 1002. The electronic document can reside on the LOS 1002 or can be uploaded from a document preparer located at a remote location via the computer network. A preferred loan document is an electronic document, having a header section, a data section, a view section and signature section as described above. The electronic document is also preferably validated, as described above. This validation can be variously applied, notably as part of document preparation 1016, closing package creation 1018, and closing 1020. Briefly, such validation may for example include assurance of data consistency across all loan documents (e.g., borrower's name, property address, etc. are the same in all documents); determination of the presence of necessary documents, such as a power of attorney; completion of all required fields; and determination that the loan meets investor delivery requirements. Validation may also be applied at lower and higher levels of abstraction after the lender has completed its initial document preparation.

Continuing with the example, the closing agent 1004 receives closing instructions from the lender and uploads the closing agent documents. Closing package creation 1018 can be centralized so that the lender 1002 and closing agent 1004 can provide the necessary closing data and electronic documents to complete a closing package. Additionally, the closing agent 1004 can invoke information provided by the lender 1002, and vice versa.

Upon completion of the closing package, the borrower 1006 signs necessary documents pursuant to the closing 1020. Documents are provided for recording as needed, such as by electronically delivering the recordable documents to the appropriate recorder 1012 and receiving indication of recorded documents. Additionally, the signed package can be used pursuant to preparation of a servicing package for servicing 1008, a delivery package for investor delivery 1002, or sent to a custodial service 1014, as is done with regard to traditional mortgage transactions.

Thus embodiments of the present invention provide electronic documents. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. An electronic document, stored on a non-transitory computer readable medium, the electronic document comprising:
   a view section, including presentation formatting for rendering a first display that provides a human readable representation corresponding to a main data set, the presentation formatting implementing view data values for the first display;
   a main data section, including the main data set, the main data set providing main data values that correspond to informational fields defined by the electronic document and being separately parseable from the view section; and
   a linking section, containing a plurality of linking elements that respectively identify main data values and corresponding view data values for a plurality of informational fields defined by the main data section and provided in the first display by the view section, the plurality of linking elements being respectively accessible for determining whether the main data section matches the first display for the plurality of informational fields, wherein individual ones of the plurality of linking elements respectively associate a first attribute and a distinctly defined second attribute, the first attribute corresponding to a main data value for a particular informational field in the main data section and the second attribute corresponding to a view data value for the particular informational field in the view section, with matching being determined where the main data value equals the view data value.

2. The electronic document of claim 1, wherein the plurality of linking elements combine to allow a verification that the main data values match the view data values as required for valid implementation of the electronic document as a particular type of document.

3. The electronic document of claim 2, wherein the particular type of document is a promissory note.

4. The electronic document of claim 1, wherein the individual linking elements identify the main data value and the corresponding view data value with pointers in the first and second attributes.

5. The electronic document of claim 1, further comprising:
   a conversion element, in communication with at least one of the plurality of linking elements, for applying a format conversion to at least one of the main data value and the view data value such that they are commonly formatted for determining whether they match.

6. The electronic document of claim 1, further comprising:
   a header section, which identifies an electronic document type and version.

7. The electronic document of claim 6, wherein the header portion further indicates whether at least one necessary party has signed the electronic document.

8. The electronic document of claim 1, further comprising:
a signature section, for storing a representation of a set of signatures corresponding to signers of the electronic document.

9. The electronic document of claim 8, wherein the set of signatures comprises digital signatures.

10. The electronic document of claim 8, wherein the main data section and the view section are wrapped with a given digital signature from the set of signatures to authenticate the data section and the view section as not having been altered since application of the given digital signature to the electronic document.

11. The electronic document of claim 1, wherein the view section further includes presentation formatting for a second display corresponding to the main data set, the presentation formatting implementing view data values for the second display.

12. The electronic document of claim 11, wherein the electronic document corresponds to a mortgage transaction and the first and second displays respectively correspond to different documents used in the mortgage transaction.

13. The electronic document of claim 11, wherein the plurality of linking elements further identify the main data values and the corresponding view data values for informational fields defined by the main data section and presented by the view section for the second display.

14. The electronic document of claim 1, further comprising:
an audit trail section that updates to log actions performed on the electronic document.

15. The electronic document of claim 14, wherein the audit trail section identifies entities corresponding to logged actions.

16. The electronic document of claim 15, wherein the logged actions include electronic document preparation activities.

17. The electronic document of claim 1, wherein said matching supports a validation applicable to the electronic document.

18. The electronic document of claim 1, wherein said matching supports a quality control process applicable to the electronic document.

19. An electronic document, stored on a non-transitory computer readable medium, the electronic document comprising:
a view section, including presentation formatting for rendering a first display that provides a human readable representation corresponding to a main data set, the presentation formatting implementing view data values for the first display;
a main data section, including the main data set, the main data set providing main data values that correspond to informational fields defined by the electronic document and being separately parseable from the view section;
a header section, which indicates an electronic document type and a state for the electronic document, wherein the state indicates a status for at least one of the view section and the main data section;
a linking section, containing a plurality of linking elements that respectively identify main data values and a corresponding view data values for a plurality of informational fields defined by the main data section and provided in the first display by the view section, the plurality of linking elements being respectively accessible for determining whether the main data section matches the first display for the plurality of informational fields, wherein individual ones of the plurality of linking elements respectively associate a first attribute and a distinctly defined second attribute, the first attribute corresponding to a main data value for a particular informational field in the main data section and the second attribute corresponding to a view data value for the particular informational field in the view section, with matching being determined where the main data value equals the view data value; and
a signature section, for providing a set of signatures corresponding to the electronic document, wherein the main data section and the view section are wrapped with a given digital signature from the set of signatures to authenticate the data section and the view section as not having been altered since application of the given digital signature to the electronic document.

20. The electronic document of claim 19, wherein the state has an assignable value of populated, which designates that a requisite set of data has been provided in the electronic document.

21. The electronic document of claim 20, wherein the state has an assignable value of signed, which designates that the electronic has been signed by a requisite set of signers.

22. The electronic document of claim 19, wherein the electronic document type is a promissory note.

23. The electronic document of claim 22, wherein the state has an assignable value of populated, which designates that a requisite set of data for the promissory note has been provided in the electronic document.

24. The electronic document of claim 19, wherein the plurality of linking elements combine to allow a verification that the main data values match the view data values as required for valid implementation of the electronic document as a particular type of document.

25. The electronic document of claim 24, wherein the particular type of document is a promissory note.

26. The electronic document of claim 19, wherein the individual linking elements identify the main data value and the corresponding view data value with pointers in the first and second attributes.

27. The electronic document of claim 19, further comprising:
a conversion element, in communication with at least one of the plurality of linking elements, for applying a format conversion to at least one of the main data value and the view data value such that they are commonly formatted for determining whether they match.

28. The electronic document of claim 19, wherein the view section further includes presentation formatting for a second display corresponding to the main data set, the presentation formatting implementing view data values for the second display.

29. The electronic document of claim 28, wherein the electronic document corresponds to a mortgage transaction and the first and second displays respectively correspond to different documents used in the mortgage transaction.

30. The electronic document of claim 19, further comprising:
an audit trail section that updates to log actions performed on the electronic document.

31. The electronic document of claim 30, wherein the audit trail section identifies entities corresponding to logged actions.

32. The electronic document of claim 31, wherein the logged actions include electronic document preparation activities.

33. The electronic document of claim 19, wherein said matching supports a validation applicable to the electronic document.

34. The electronic document of claim 19, wherein said matching supports a quality control process applicable to the electronic document.

* * * * *